United States Patent [19]
Conley

[11] 3,940,454
[45] Feb. 24, 1976

[54] TRANSPARENT HIGH IMPACT GRAFT POLYMERS

[75] Inventor: David O. Conley, Newark, Ohio

[73] Assignee: Borg-Warner Corporation, Chicago, Ill.

[22] Filed: May 6, 1974

[21] Appl. No.: 467,321

Related U.S. Application Data

[63] Continuation of Ser. No. 272,254, July 17, 1972, abandoned, Continuation-in-part of Ser. No. 86,952, Nov. 4, 1970, abandoned, Continuation-in-part of Ser. No. 667,655, Sept. 14, 1967, abandoned.

[52] U.S. Cl. ............................ 260/880 R; 260/879
[51] Int. Cl.² .................... C08L 9/00; C08L 9/06
[58] Field of Search ..................... 260/879, 880 R

[56] References Cited
UNITED STATES PATENTS

| | | | |
|---|---|---|---|
| 3,426,102 | 2/1969 | Solak | 260/879 |
| 3,557,254 | 1/1971 | Bauer | 260/879 |
| 3,586,737 | 6/1971 | Duke | 260/879 |

FOREIGN PATENTS OR APPLICATIONS

| | | |
|---|---|---|
| 1,009,360 | 11/1965 | United Kingdom |

*Primary Examiner*—Paul R. Michl
*Attorney, Agent, or Firm*—Richard J. Schlott

[57] ABSTRACT

Graft polymers comprised of rubbery polymeric substrates with methacrylonitrile grafted thereon. The graft polymers are characterized by being transparent and containing methacrylonitrile as a grafting monomer in an amount from about 85 per cent to about 95 per cent by weight of the total graft polymer.

3 Claims, No Drawings

TRANSPARENT HIGH IMPACT GRAFT POLYMERS

CROSS REFERENCE TO RELATED APPLICATION

This application is a continuation of application Ser. No. 272,254, filed July 17, 1972, now abandoned, which was a continuation-in-part of Ser. No. 86,952, filed Nov. 4, 1970 now abandoned which was a continuation-in-part of Ser. No. 667,655, filed Sept. 14, 1967 now abandoned.

BACKGROUND

A great variety of polymeric materials known as graft polymers have been prepared prior to this invention. Perhaps the best known graft polymers are those known as ABS graft polymers which are prepared by polymerizing a monomer such as butadiene or monomers such as butadiene and styrene to form either a homopolymer or a copolymer backbone substrate and thereafter polymerizing grafting monomers such as styrene and acrylonitrile in the presence of the prepolymerized backbone substrate material.

In preparing graft polymers, either a rubbery backbone or a resinous backbone may be utilized. If the prepolymerized monomer is predominately a rubber forming monomer such as a conjugated diene, the backbone will be flexible and if the monomer is predominantly a resin forming monomer such as styrene, the backbone material will be resinous and inflexible. The polymerizing of a second monomer or group of monomers in the presence of the prepolymerized backbone material causes the second monomer or monomers to become bonded in chains on the prepolymerized backbone to form what is known as a graft polymer.

The most conventional ABS graft polymers are those wherein the prepolymerized material is a rubbery polymer or copolymer such as polybutadiene or butadiene-styrene and those monomers that are normally copolymerized in the presence of the rubbery backbone are acrylonitrile, styrene and acrylic acid ester such as methyl acrylate, ethyl acrylate, butyl acrylate, methyl methacrylate and the like.

Generally, those monomers that were utilized as grafting monomers in the preparation of ABS graft polymers prior to this invention were monovinyl aromatic hydrocarbons, acrylonitrile, and substituted acrylonitrile. Though these materials exhibited high impact strengths and a favorable balance of physical properties, they were generally known to be opaque and therefore were difficult to load with a high degree of pigment and could not be used in applications where clarity was a desired characteristic.

Perhaps one of the greatest disadvantages in obtaining transparency with the previously known ABS graft polymers was their tendency to lose impact strength at a high degree of transparency. Further, as mentioned, it was difficult to load to opaque and translucent polymers to obtain depth of color while retaining the desired high impact characteristics. It was found that if the refractive index of the substrate did not closely coincide with that of the grafting monomers, the polymeric materials would necessarily be translucent or opaque.

SUMMARY OF THE INVENTION

This invention is directed to high impact resistant graft polymers that may be used as pipe, sheet molded articles and the like which have a better retention of impact strength and appearance than the normal ABS graft polymers and may be prepared so as to be transparent over a wide range of monomeric ingredients. The transparent polymers have particular utility as lamp globes, panels and highly pigmented polymeric materials due to their high degree of light transmission.

The graft polymers of this invention are prepared by prepolymerizing a conjugated diene monomer such as butadiene or conjugated diene monomer along with another monomer copolymerizable therewith such as styrene, to form a rubbery backbone substrate. Methacrylonitrile is thereafter polymerized in the presence of the preformed rubbery backbone substrate.

The rubbery backbone substrate graft polymer of this invention may comprise from about 5 percent to 15 percent of the total composition and the methacrylonitrile grafted thereon will comprise from about 95 percent to about 85 percent of the total composition.

In order to obtain optimum clarity (light transmission), it is necessary that the refractive index of the rubbery backbone substrate coincide with that of the composition formed by polymerizing methacrylonitrile in the presence of the substrate polymer.

The rubbery backbone is prepared as a synthetic rubbery latex by polymerizing the rubbery forming monomers in aqueous emulsion in the presence of a conventional catalyst, emulsifying agent, etc., at conventional polymerization temperatures from about 0° to about 100° C.

The rubbery backbone is normally a conjugated diene polymer, e.g., prepared from butadiene, isoprene, chloroprene, piperylene, etc. The backbone may also be a copolymer of a conjugated diene with a minor amount, ie., up to 40% by weight, of another vinylic monomer copolymerized therewith selected from the group styrene and substituted styrene, e.g., vinyl toluene, vinyl xylene, alpha-methylstyrene and chlorostyrene; alkyl acrylate, e.g., methyl acrylate, ethyl acrylate, propyl acrylate and alkyl alkacrylate, e.g., methyl methacrylate, ethyl methacrylate, methyl ethacrylate and methyl crotonate.

The polymerization of the methacrylonitrile in the presence of the preformed backbone will take place in aqueous emulsion in the presence of an emulsifying agent and a catalyst such as peroxide, hydroperoxide, azo compound or persulfate at conventional temperatures of from 0° to 100° C. It is desirable to maintain a pH close to neutral or on the acid side for optimum color and clarity. In polymerizing the methacrylonitrile in admixture with the synthetic rubber latex, the catalyst may be added to the latex continuously or incrementally or the catalyst and the latex may be added at the beginning of the polymerization.

In the preparation of the graft polymers of this invention, suitable emulsifiers such as phosphate esters, sulfonates, sulfates, sulfosuccinates and the like may be used.

During the preparation or after the preparation of the polymeric material, stabilizers are added to provide oxidative and color stability.

The range of monomeric ingredients as well as polymerization conditions will be understood from the examples in which typical charges for the polymerization are set forth. In all the examples listed below, parts are by weight unless otherwise indicated.

In the preparation of the graft polymer of Example I and subsequent examples which followed the procedure of Example I, the polymerization of the rubbery backbone polymer (illustrated by butadiene or butadiene and a monomer copolymerizable therewith) was carried out in a closable reactor provided with a heating and cooling jacket and with an anchor stirrer. The water, potassium persulfate initiator, sodium alkylate sulfonate, tetrasodium pyrophosphate and tertiary dodecyl mercaptan were charged to the reactor with stirring to dissolve. The reactor was closed and the reactor space above the liquid was purged with butadiene and butadiene was charged to the reactor. The temperature was raised to approximately 50°C. and agitation was commenced. The temperature and agitation were maintained for about 24 hours, at which time the pressure had dropped to about 20 psig. The butadiene was vented with continued stirring of the contents of the reaction vessel. The latex remaining in the vessel contained about 40 percent of polybutadiene dispersed therein. A recipe for the preparation of the polybutadiene substrate is as follows:

|  | Parts by Weight |
| --- | --- |
| Butadiene | 100 |
| Water | 150 |
| Sodium Alkylate Sulfonate | 3.25 |
| Tetrasodium Pyrophosphate | 0.10 |
| Potassium Persulfate | 0.25 |
| Tertiary Dodecyl Mercaptan | 0.20 |
| Reactor Temperature | 50°C. |
| Reactor Pressure | 85 psi |
| Per Cent Solids | 40 |

That amount of the polybutadiene (emulsion) shown in Table 1, Example I, was charged to a second reactor along with the indicated amount of methacrylonitrile, sodium lauryl sulfate, tertiary butyl peroxypivalate, sodium dioctylsulfosuccinate, tertiary dodecyl mercaptan, dipentene dimercaptan and water. The vessel was closed and the residual air in the vessel was purged with nitrogen. The charge mixture temperature was raised to about 65° C. for eighteen hours and the resultant latex was coagulated with divalent salt ($CaCl_2$) or trivalent salt ($Al_2(SO_4)_3$), washed and dried.

The reaction pH of between 2 and 7 is normally maintained by adding an acid such as HCl, $H_2SO_4$ $H_3PO_4$ or the like in order to obtain the best color stability of the final polymer.

In the procedure set forth above for the preparation of the graft polymers, the polymer may be recovered from the emulsion using any of the known methods for breaking acid stable emulsions. For example, divalent ions such as calcium, magnesium, barium, other group II metals and trivalent salts such as aluminum sulfate may be used. Other direct techniques such as spray drying of the latex are also operable. The filtered latex was used in preparing compositions which were tested for izod impact, Rockwell hardness and other physical properties such as set forth in the tables.

In the tables below, the percent clarity was measured as the percent of light transmitted at 520 microns wave length at a thickness of 125 mils. This percent of light transmitted is the standard test herein. In order to understand the amount of transparency, it is necessary that the percent of transmission be compared with that of other materials. For example, the ABS graft polymer prepared by polymerizing 30 parts of acrylonitrile and 50 parts of styrene in the presence of 20 parts of prepolymerized butadiene, i.e., polybutadiene, has a percent of clarity of less than 5 using the standard test. Glass has a percent of clarity of 90 and clear polyvinyl chloride has a percent of clarity of 72 using the standard test. It should also be noted that in the examples, all of the samples would transmit light directly, i.e., newsprint could be read through the sample and the light was not diffused as in translucent materials.

TABLE 1 (Batch)

|  | I |
| --- | --- |
| Polybutadiene (Emulsion) | 10 |
| Methacrylonitrile | 90 |
| Sodium Lauryl Sulfate | 1.25 |
| t-Butyl Peroxypivalate | 0.5 |
| Sodium Dioctyl Sulfosuccinate | 0.5 |
| t-Dodecyl Mercaptan | 0.3 |
| Dipentene Dimercaptan | 0.1 |
| Water | 250 |
| Izod Impact Strength ⅛" Notch | 1.4 |
| Hardness, Rockwell | 117 |
| Clarity - %* | 55 |

*Measurement of percent light transmission at 520 microns wave length at a thickness of 125 mils.

TABLE 2 (Batch)

|  | II | III |
| --- | --- | --- |
| Polybutadiene (Emulsion) | 10 | 10 |
| Methacrylonitrile | 90 | 90 |
| Sodium Dodecyldiphenyl Ether Disulfonate | 1.0 | 1.0 |
| t-Butyl Peroxypivalate | 0.3 | 1.0 |
| Water | 200 | 200 |
| Additional tBPP Added After 5 hours | 0.3 |  |
| Izod Impact Strength ⅛" Notch | 4.3 | 3.0 |
| Tensile Strength, psi | 9200 | 9200 |
| Tensile Elongation, % | 8 | 7 |
| Tensile Modulus ($10^{-5}$) psi | 5.0 | 4.8 |
| Heat Distortion Temperature at 264 psi |  |  |
| Unannealed, °F. | 197 | 205 |
| Annealed, °F. | 224 | 223 |
| Hardness, Rockwell | 119 | 118 |
| Clarity, *% | 56 | 52 |

*Measurement of percent light transmission at 520 microns wave length at a thickness of 125 mils.

| Example II | OUTDOOR AGING RESULTS | | | |
| --- | --- | --- | --- | --- |
|  | Control | 3 Months | 6 Months | 12 Months |
| Izod Impact Strength, ⅛" N. | 4.3 | 4.2 | 4.4 | 4.1 |
| Tensile Strength, psi | 9200 | 9000 | 8700 | 8200 |

-continued

| Example II | OUTDOOR AGING RESULTS | | | |
|---|---|---|---|---|
| | Control | 3 Months | 6 Months | 12 Months |
| Tensile Elongation, percent | 30 | 17 | 10 | 10 |
| Tensile Modulus, $(10^{-5})$ | 5.0 | 4.5 | 4.6 | 4.7 |

TABLE 3 (Batch)

| | IV |
|---|---|
| 70/30 Butadiene-Styrene Copolymer (Emulsion) | 10 |
| Methacrylonitrile | 90 |
| Sodium Lauryl Sulfate | 1.25 |
| Sodium Dioctyl Sulfosuccinate | 0.5 |
| t-Butyl Peroxypivalate | 0.5 |
| Water | 250 |
| Izod Impact Strength, ⅛" N. | 1.0 |
| Tensile Strength, psi | 10,000 |
| Tensile Elongation, % | 8 |
| Tensile Modulus, psi $(10^{-5})$ | 4.8 |
| Hardness, Rockwell | 120 |
| Clarity*, % | 63 |

*Measurement of percent light transmission at 520 wave length at a thickness of 125 mils.

TABLE 4

| | V |
|---|---|
| 70/30 Butadiene-Styrene Copolymer (Emulsion) | 10 |
| Methacrylonitrile | 90 |
| Sodium Lauryl Sulfate | 1.25 |
| Sodium Dioctyl Sulfosuccinate | 0.5 |
| t-Butyl Peroxypivalate | 0.5 |
| Water | 250 |
| Izod Impact Strength, ⅛" Notch | 1.0 |
| Tensile Strength, psi | 9700 |
| Tensile Elongation, % | 8 |
| Tensile Modulus, psi $(10^{-5})$ | 4.8 |
| Hardness, Rockwell | 120 |

It will be noted from the tables that the graft polymers of this invention have a high level of impact resistance and tensile strength combined with good light transmission. The polymers are also characterized by having very good stability and will retain their desirable physical properties though they are used in outdoor applications, such as in sheeting and molded objects. As was noted previously, the clarity of the polymeric products lends them the distinct advantage of being able to obtain excellent depth of color when pigments are added thereto.

Though the invention has been described with respect to certain specific embodiments thereof, it will be understood by those skilled in the art that this is by way of illustration and not limitation and the scope of the invention should be defined as broadly as is consistent with the prior art.

What is claimed:

1. A transparent graft polymer prepared in a manner whereby the refractive index of the polymerized grafting monomers, after polymerization in the presence of the substrate, is substantially equal to the graft polymer substrate, said graft polymer prepared by polymerizing about 90 percent by weight of methacrylonitrile in the presence of about 10 percent by weight of a rubbery polymeric substrate selected from the group consisting of conjugated diene homopolymers and copolymers consisting of a conjugated diene and up to about 40 percent by weight of a monomer selected from the group consisting of styrene, substituted styrene, alkyl acrylate and alkyl alkacrylate.

2. The graft polymer of claim 1 wherein the rubbery polymeric substrate is polybutadiene.

3. The graft polymer of claim 1 wherein the rubbery polymeric substrate is a copolymer of butadiene and styrene.

* * * * *